May 12, 1959     E. S. MacPHERSON     2,886,341

BALL JOINT SUSPENSION FOR MOTOR VEHICLE

Filed May 20, 1955     2 Sheets-Sheet 1

E. S. MacPHERSON
INVENTOR.

BY *E. C. McRae*
*J. R. Faulkner*
*G. H. Oster*

ATTORNEYS

May 12, 1959      E. S. MacPHERSON      2,886,341
BALL JOINT SUSPENSION FOR MOTOR VEHICLE
Filed May 20, 1955      2 Sheets-Sheet 2
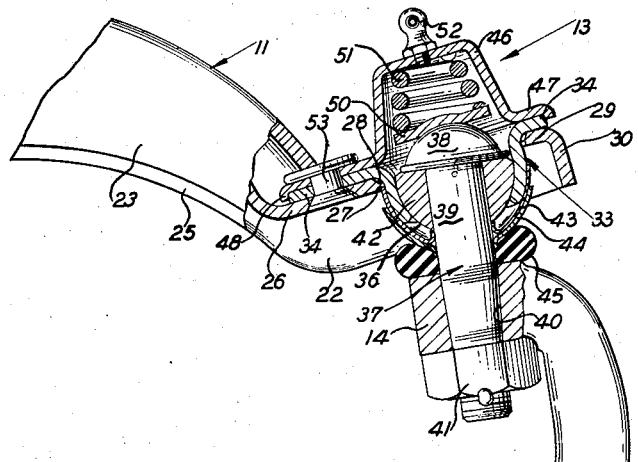
FIG. 2
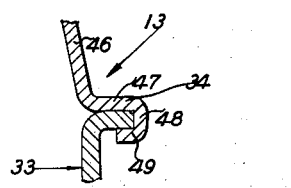
FIG. 5
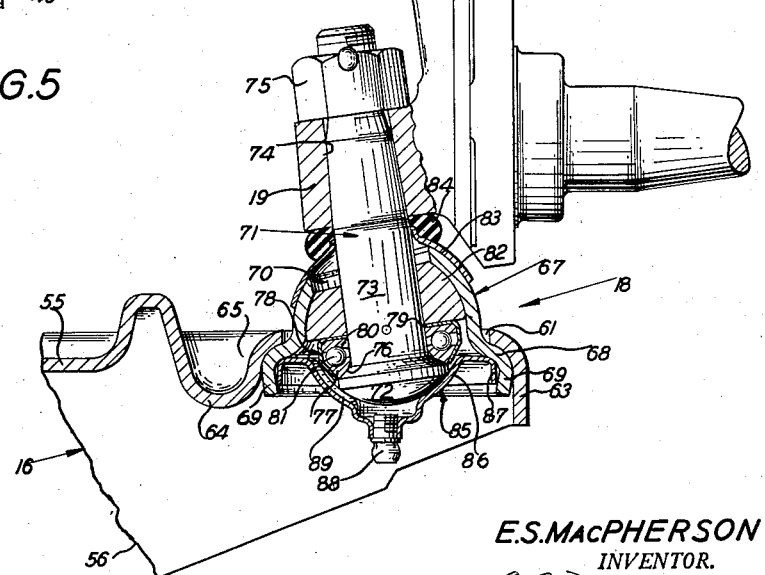
E. S. MacPHERSON
INVENTOR.
BY E. C. McRae
J. R. Faulkner
D. H. Oster
ATTORNEYS

United States Patent Office 2,886,341
Patented May 12, 1959

2,886,341

BALL JOINT SUSPENSION FOR MOTOR VEHICLE

Earle Steele MacPherson, Huntington Woods, Mich., assignor to Ford Motor Company, Dearborn, Mich., a corporation of Delaware Application May 20, 1955, Serial No. 509,746

2 Claims. (Cl. 280—96.2)

This invention relates generally to ball joint suspensions for motor vehicles, and has particular reference to a suspension of this type incorporating stamped ball joint units.

An object of the present invention is to provide a ball joint suspension for a motor vehicle in which the ball joint units incorporate stamped components and provide an economical construction of the requisite strength and durability.

A further object of the invention is to provide a ball joint suspension for a motor vehicle in which the outer end portion of a stamped suspension arm is formed with an opening for the reception of a ball joint socket, with the opening being so located as to provide a continuous supporting portion on the suspension arm surrounding the opening to support the mounting flange of the ball joint socket. With this construction the ball joint socket and the suspension arm co-operate to form a strong rigid assembly.

Still another object of the present invention is to provide a ball joint suspension for a motor vehicle in which the usual stud retainer and spring are eliminated from the lower load carrying ball joint unit. The present construction also provides a simple yet effective assembly of a stamped ball joint socket and a stamped socket cover for each ball joint unit.

Other objects and advantages of this invention will be made more apparent as this description proceeds, particularly when considered in connection with the accompanying drawings, wherein:

Figure 2 is an enlarged elevational view of a portion of the construction shown in Figure 1, partly broken away and in section to show the upper and lower ball joint units.

Figure 5 is a fragmentary cross sectional view taken on the line 5—5 of Figure 3.

Figure 1:
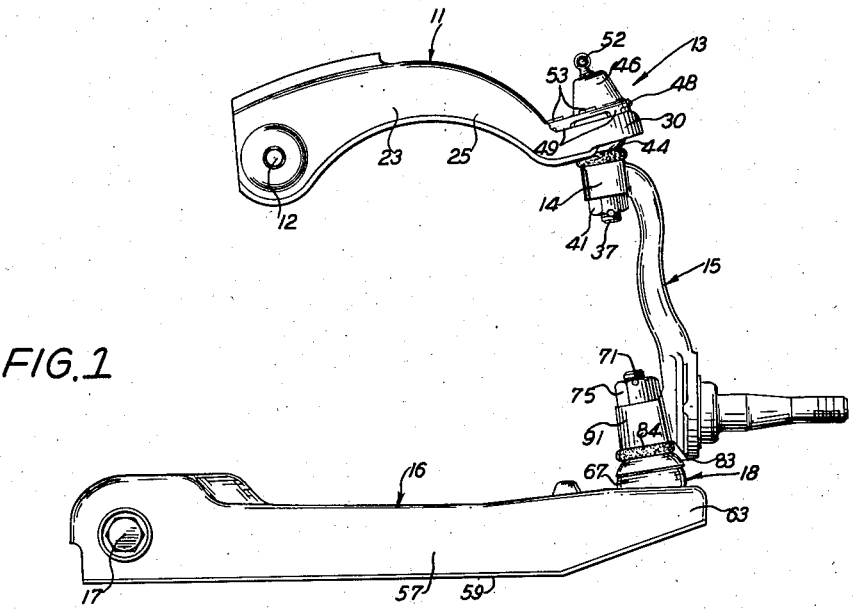
Figure 1 is a front elevational view of a portion of an independent wheel suspension incorporating the present invention.

Referring now to the drawings, and particulary to Figure 1, the reference character 11 indicates generally the upper suspension arm of an independent front wheel suspension for a motor vehicle. At its inner end the upper suspension arm 11 is pivotally connected at 12 to a motor vehicle frame (not shown) in conventional manner, and at its outer end is connected by means of an upper ball joint unit 13 to the upper flange 14 of a wheel spindle 15. The inner end of the lower suspension arm 16 is pivotally connected at 17 to the vehicle frame, and at its outer end is connected by means of a lower ball joint unit 18 to the lower flange 19 of the wheel spindle 15.

Figure 3:
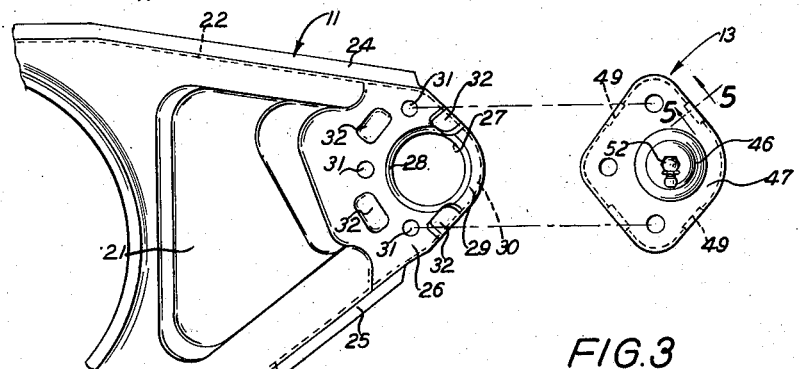
Figure 3 is an exploded plan view of a portion of the upper suspension arm and the upper ball joint unit.

As best seen in Figure 3, the upper suspension arm 11 comprises a one-piece sheet metal stamping having a contoured central web portion 21 and generally vertical side flanges 22 and 23. The lower extremities of the side flanges 22 and 23 merge into marginal flanges 24 and 25, respectively.

The outer end portion 26 of the web 21 of the upper suspension arm 11 is generally flat and is formed with a relatively large circular opening 27 having a chamfered edge 28. It will be noted that the opening 27 is spaced a short distance inwardly from the outer end of the suspension arm to provide a continuous supporting portion 29 completely around the opening. As will be seen in Figures 1 and 3, the integral side flanges 22 and 23 of the upper suspension arm merge into a generally vertical marginal flange 30 strengthening the flat end portion 26 of the web of the arm and providing rigidity to the continuous supporting portion 29 surrounding the opening 27. The end portion 26 of the suspension arm is also formed with three spaced mounting holes 31 and with four generally rectangular depressions 32.

Referring now to Figures 2 and 3, the upper ball joint unit 13 comprises a stamped sheet metal socket 33 having a peripheral mounting flange 34. The socket 33 is of semispherical shape and projects downwardly through the circular opening 27 in the outer end portion 26 of the upper suspension arm 11, and the mounting flange 34 rests upon the upper surface of the end portion 26 of the suspension arm. The lower portion of the socket 33 is formed with an elongated opening 36.

A stud 37 having an enlarged semispherical head 38 and a shank 39 is mounted in a tapered hole 40 formed in the upper flange 14 of the wheel spindle 15, and is retained therein by means of a nut 41. A semispherical bearing member 42 is sleeved over the shank 39 of the stud 37 in abutting relationship with the enlarged head 38 thereof, and engages the inner surface of the semispherical socket 33. The elongated opening 36 in the socket 33, which accommodates angular movement of the stud 37, is sealed against dust by means of a dust cover 43, a dust shield 44 and a rubber sealing ring 45.

A hat shaped sheet metal cover 46 is provided for the upper ball joint 13, and is formed with a flat mounting flange 47 abutting the upper surface of the mounting flange 34 of the sheet metal socket 33. The mounting flange 47 of the cover 46 is formed with a peripheral flange 48 engaging the periphery of the mounting flange 34 of the socket 33. The peripheral flange 48 is extended at four points to form ears 49 which, as shown in Figure 5, are crimped over the flange 34 of the socket to assemble the socket and cover together.

The hat shaped cover 46 encloses a dished washer 50 forming a seat for the semispherical head 38 of the stud 37, and a coil spring 51 urges the washer into frictional engagement with the stud head. The spring is properly selected to provide a predetermined amount of frictional resistance to movement of the stud within the socket. A grease fitting 52 is mounted in the upper portion of the hat shaped cover 46 to provide for lubrication of the joint.

It will be noted that the mounting flange 48 of the cover 46 corresponds in shape to the shape of the mounting flange 34 of the socket 33 and positions the socket and cover in proper relationship with respect to each other. The tabs 49, when crimped over the flange 34 of the socket, hold the parts of the upper ball joint unit 13 in assembled relationship so that the unit can be preassembled in readiness for mounting upon the upper suspension arm 11. The mounting of the ball joint unit 13 upon the upper suspension arm 11 is accomplished by positioning the unit upon the arm with the socket extending through the opening 27 in the arm and then riveting the unit to the arm by means of rivets 53 extending through the openings 31 in the suspension arm and through aligned openings in the flanges 34 and 46 of the socket 33 and cover 47 respectively. It will be seen that the rectangular depressions 32 in the suspension arm provide clearance for the crimped-over tabs 49 at the periphery of the ball joint unit.

With reference to Figure 3, it will be apparent that the continuous supporting portion 29 of the upper suspension arm 11 of the flat outer end portion of the arm forms a full supporting surface for the juxtaposed flanges 34 and 47 of the socket 33 and cover 46 respectively, so as to form a strong rigid support for the upper ball joint unit. The marginal flange 30 of the suspension arm reinforces this support.

Figure 4:
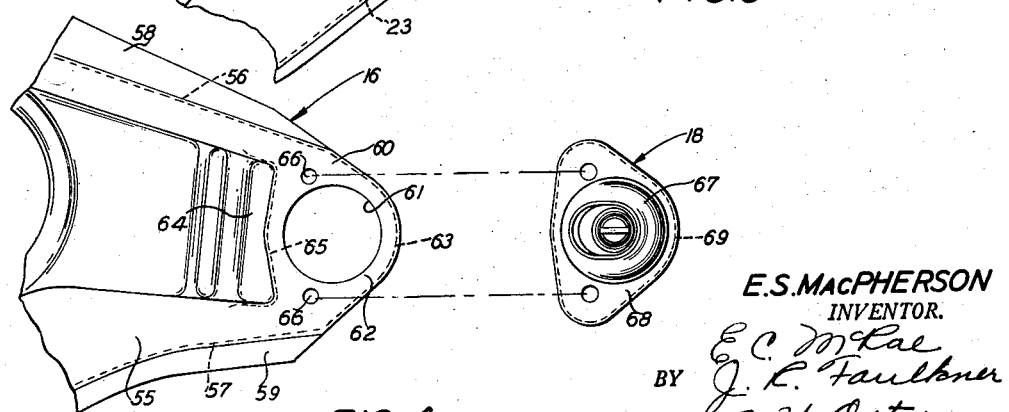
Figure 4 is an exploded plan view of a portion of the lower suspension arm and the lower ball joint unit.

Reference is now made to Figures 2 and 4 for a description for the lower ball joint unit 18 mounted upon the lower suspension arm 16. The lower suspension arm 16 is a sheet metal stamping formed with a central web portion 55 having side flanges 56 and 57 merging into marginal flanges 58 and 59. The outer end portion 60 of the web 55 of the lower suspension arm it flat and is formed with a relatively large circular opening 61. The opening 61 in the lower arm is so positioned as to provide a continuous supporting surface 62 surrounding the opening and spaced a short distance from the outer end of the arm. This supporting surface is reinforced by means of a vertical end flange 63 forming a continuation of the side flanges 56 and 57 of the arm. In addition, the web 55 of the lower suspension arm is formed with a lateral rib 64 having a vertical flange 65 spaced a short distance from the inner side of the circular opening 61. A pair of mounting holes 66 are provided in the flat outer portion 60 of the suspension arm web.

The lower ball joint unit 18 has a stamped sheet metal semispherical socket 67 adapted to project upwardly through the opening 61 in the lower suspension arm. Integrally formed with the socket 67 is a flat mounting flange 68 having a contour best seen in Figure 4, and terminating in a peripheral flange 69. The upper end of the socket 67 is formed with an elongated opening 70.

A ball joint stud 71 having an enlarged semispherical head 72 and a shank 73 is mounted in a tapered opening 74 in the flange 19 of the wheel spindle 15, and is retained therein by means of a nut 75. The underside of the head 72 of the stud is chamfered at 76 to receive the lower race 77 of a self-contained ball bearing assembly 78. A sheet metal housing 79, an upper race 80, and a series of balls 81 complete the ball bearing assembly 78. The self-contained ball bearing assembly 78 eliminates the necessity for forming ball races in the bearing member and in the stud head, and also facilitates assembly.

A semispherical bearing member 82 is sleeved on the shank 73 of the stud 71 and is seated against the sheet metal housing 79 of the ball bearing assembly 78. The outer surface of the bearing member 82 engages the inner surface of the semispherical socket 67, and the enlarged opening 70 in the socket accommodates the angular movement of the stud. A dust seal 83 and an angular rubber seal 84 close the opening against the entrance of foreign matter.

The lower end of the socket 67 is closed by a sheet metal cover 85 having a semispherical central portion 86 directly engaging the correspondingly shaped head 72 of the stud 71. The necessity for a separate stud retainer and spring is thus eliminated. The cover 85 has a peripheral flange 87 adapted to be snapped within the peripheral flange 69 of the socket 67 which, it will be noted, is inclined inwardly to retain the cover. A grease fitting 88 is mounted in the lower end of the cover 85, and a plurality of lubricant grooves 89 are formed in the cover to facilitate the proper distribution of the lubricant. It will be noted from Figures 2 and 4 that the flange 68 of the socket 67 of the lower ball joint unit is adapted to be seated upon the supporting portion 62 of the lower suspension arm 16. In addition, the major portion of the marginal flange 69 in the socket bears against the flanges 63 and 65 of the suspension arm to locate the ball joint unit and provide a strong rigid support therefor.

It will be understood that the invention is not to be limited to the exact construction shown and described, but that various changes and modifications may be made without departing from the spirit and scope of the invention, as defined in the appended claims.

What is claimed is:

1. In an independent suspension system for a motor vehicle having a wheel spindle, a generally horizontally extending stamped sheet metal suspension arm pivotally connected at one end to said vehicle, the opposite end of said suspension arm having a flat coplanar supporting portion at least partially bordered at its outer extremity by an integral flange extending substantially at right angles from one side of said suspension arm, said flat supporting portion having a generally centrally located opening therethrough providing a flat ledge on said one side completely around said opening between said opening and said integral flange, a one piece stamped ball joint socket having a generally spherical socket portion, an intermediate integral flat mounting portion projecting laterally from said socket portion and extending completely therearound and an integral marginal flange extending at right angles to said intermediate flat mounting portion and on the opposite side thereof from said socket portion, said ball joint socket being mounted upon said suspension arm with said socket portion projecting through the opening in said arm on the side of said arm opposite said one side and with said intermediate flat mounting portion seated upon the flat ledge portion of said arm on said one side thereof, the marginal flange of said ball joint socket being seated against the inner face of said integral flange of said suspension arm to provide lateral support therefor.

2. The structure defined by claim 1 which is further characterized in that said opening is circular and the intermediate flat supporting portion of said arm and the intermediate flat mounting portion of said ball joint socket are non-circular and correspond in shape and size to each other.

References Cited in the file of this patent

UNITED STATES PATENTS

| | | |
|---|---|---|
| 2,556,767 | McCann | June 12, 1951 |
| 2,611,625 | Kishline | Sept. 23, 1952 |
| 2,645,510 | Booth | July 14, 1953 |
| 2,797,930 | Booth | July 2, 1957 |